United States Patent
Iida

(10) Patent No.: US 6,379,559 B1
(45) Date of Patent: Apr. 30, 2002

(54) METHOD OF MAKING SLUDGE PRECIPITATED IN A CHROMIUM PLATING IMPURITY RECOVERY ELECTROLYSIS TANK HARMLESS

(76) Inventor: Hideomi Iida, c/o Nichie Hard Chrome Industrial Company of 224, Nishimiyanosawa 2-jyo 2-chome, Teine-ku, Sapporo-shi, Hokkaido (JP)

(*) Notice: Subject to any disclaimer, the term of this patent is extended or adjusted under 35 U.S.C. 154(b) by 0 days.

(21) Appl. No.: 09/166,088

(22) Filed: Oct. 5, 1998

(30) Foreign Application Priority Data

Oct. 29, 1997 (JP) ............................................. 9-297481

(51) Int. Cl.⁷ ................................................. C02F 1/70
(52) U.S. Cl. ...................... 210/720; 210/730; 210/757; 210/770; 210/772
(58) Field of Search ................................ 210/757, 720, 210/729, 730, 769, 770, 772, DIG. 30

(56) References Cited

U.S. PATENT DOCUMENTS

| | | | | |
|---|---|---|---|---|
| 3,784,669 A | * | 1/1974 | Elges | |
| 3,803,032 A | * | 4/1974 | Adachi | |
| 4,468,461 A | * | 8/1984 | Bopp | 435/253 |
| 5,062,956 A | * | 11/1991 | Lupton | 210/720 |
| 5,106,508 A | * | 4/1992 | Schwitzgebel | |
| 5,200,088 A | * | 4/1993 | Pilznienski | 210/720 |
| 5,416,252 A | * | 5/1995 | Sorrentino | 588/257 |
| 5,431,825 A | * | 7/1995 | Diel | 210/719 |
| 5,766,428 A | | 6/1998 | Iida | |
| 5,951,457 A | * | 9/1999 | James | |
| 6,132,790 A | * | 10/2000 | Schlipalius | |

FOREIGN PATENT DOCUMENTS

| | | | | |
|---|---|---|---|---|
| JP | 49-29866 | * | 2/1970 | ........ 210/DIG. 30 |
| JP | 48-71371 | | 9/1973 | |
| JP | 50-5276 | | 1/1975 | |
| JP | 50-005276 A1 | * | 1/1975 | |
| JP | 50-25915 | | 8/1975 | |
| JP | 53-3967 | | 1/1978 | |
| JP | 53-048350 A1 | * | 5/1978 | |
| JP | 54-039373 A1 | * | 3/1979 | |
| JP | 54-061077 A1 | * | 5/1979 | |
| JP | 61-58235 | | 12/1986 | |
| JP | 6191852 | | 7/1994 | |
| JP | 09-165699 A1 | * | 6/1997 | |
| JP | 9-165699 | | 6/1997 | |
| JP | 9-285800 | | 11/1997 | |
| JP | 9-285800 A1 | * | 11/1997 | |

OTHER PUBLICATIONS

An English Language abstract of JP 6–191852.
An English Language abstract of JP 53–3967.
An English Language abstract of JP 50–25915.
An English Language abstract of JP 50–5276.
An English Language abstract of JP 61–58235.
English Language Abstract of JP No. 9–165699.
English Language Abstract of JP No. 9–285800 (family member of JP No. 8–102527).

* cited by examiner

Primary Examiner—Chester T. Barry
(74) Attorney, Agent, or Firm—Greenblum & Bernstein, P.L.C.

(57) ABSTRACT

The aim of this invention is to resolve problems in sludge treatment methods, and to render sludge containing harmful substances produced in large amounts in chromium plating works harmless with reproducibility by effective use of certain substances. The invention resolves these problems by separating metal ions such as iron, copper, zinc and chromium contained in chromium plating effluent or a mixed solution of chromium plating solution, chromium plating effluent and chromic acid wash water in an impurity recovery electrolysis tank A in the form of a sludge, extracting the sludge, washing the sludge with water, separating the wash water containing chromic acid, drying the sludge which sedimented in the water washing step by natural or assisted drying, adding a natural organic substance to the sludge and reduction calcinating the sludge.

5 Claims, 4 Drawing Sheets

METHOD OF MAKING SLUDGE PRECIPITATED IN A CHROMIUM PLATING IMPURITY RECOVERY ELECTROLYSIS TANK HARMLESS

A method of making sludge precipitated in a chromium plating impurity recovery electrolysis tank harmless.

BACKGROUND OF THE INVENTION

1. Field of the Invention

This invention relates to a method of making sludge comprising harmful substances produced in large quantities in plating works, harmless.

2. Description of the Prior Art

At present, methods for the treatment of chromium plating solutions and chromium plating effluent in plating works may be broadly divided into 3 types.

1. After reducing hexavalent chromium in chrome effluent to trivalent chromium using a reducing agent, it is precipitated as chromium hydroxide, the flow of supernatant liquid is controlled as process water, and discharged.

2. An ion exchange resin is used. Chromium effluent is subjected to ion exchange on a free base type, strongly basic anion exchange resin, and recovered as a tribasic chromic acid. In this ion exchange method, when the chromium effluent is treated by ion exchange, the upper concentration limit of chromic acids has to be controlled, and it is necessary to remove or insert the strongly basic anion exchange resin. After adjusting pH, hexavalent chromium is reduced to trivalent chromium, and a reagent is added to precipitate the chromium as chromium hydroxide which is separated.

3. In the impurity recovery electrolysis tank, chromium is re-used as chromium plating solution, and metal ions of impurities are precipitated as iron hydroxide.

The chromium hydroxide in the first and second methods, and the iron hydroxide in the third method, are harmful, toxic substances. At present, after reduction and neutralization, the sludge is treated so that it does not correspond to any of the toxic or dangerous substances specified in Treatment Regulations (Elution Landfill Regulations for Industrial Waste Containing Hexavalent Chromium Not Exceeding 1.5 mg/l), and is then buried.

The iron hydroxide of the third method is produced in large quantity when the chromium plating solution (chromium plating effluent which is periodically replaced) in the chrome treatment room is periodically collected for quality control purposes, and after filtering off solid suspended and floating matter contained therein, metal ions such as iron, copper, zinc and chromium contained in the chromium plating effluent are separated in the impurity recovery electrolysis tank, and the remaining solution is re-used as a plating solution. It is also produced in large quantity when the mixed chromium plating solution, chromium plating effluent and chromic acid wash water in the Closed Recycling System for Chromium Plating Solution, Chromium Plating Effluent or Chromic Acid Wash Water described in Japanese Patent Laid-Open No. Hei 9-165699 already proposed by the Inventor is collected, the solution is filtered, metal ions such as iron, copper, zinc and chromium contained in the mixed solution are separated in the impurity recovery electrolysis tank, and the remaining solution is re-used as a plating solution.

However, there is a basic problem in that, at present, the elution amount of hexavalent chromium can only be reduced to approximately the amount of 1.5 mg/l or less specified in the Waste Landfill Regulations.

In addition, there are major problems in the reducing and neutralizing processes in that equipment, treatment reagent and pollution treatment (sludge treatment) costs are high, and advanced operation and control technology is required which exceeds the management capacity of small and medium-sized industries.

SUMMARY OF THE INVENTION

In this context, the Inventor has proposed Japanese Patent Application No. Hei 8-102527 which offers a method of rendering sludge harmless.

In this previous application, sludge which has separated in an impurity recovery electrolysis tank is washed with water, the sludge which has sedimented after washing is dried, and it is then calcinated to make it harmless.

However, this previous application is intended to deal with only small amounts of sludge, i.e. 10 g, and there was no unexpected elution of hexavalent chromium. However, when 100 g or more of sludge was calcinated and examined, hexavalent chromium was eluted, so this method could not render sludge harmless with high reproducibility.

This invention, which was conceived in view of the aforesaid situation, therefore aims to resolve current problems in sludge treatment techniques, and render sludge containing harmful substances, which is produced in large quantity in plating works, harmless with high reproducibility by effectively using certain substances.

The inventor, as a result of extensive studies on sludge with adhering hexavalent chromium, discovered that natural organic substances could remove hexavalent chromium and thereby arrived at the present invention.

The essential feature of this invention is to remove sludge, obtained by separating metal ions such as iron, copper, zinc and chromium contained in chromium plating effluent or a mixture of chromium plating effluent and chromic acid wash water, wash the sludge with water, separate and retain the wash water containing chromium, dry the sludge which has sedimented after washing, add a natural organic substance to the sludge, and reduction calcinate it.

Preferably, the invention will provide an effective use for rice husks, a natural organic substance whereof 80% of the total production in Japan is treated as industrial waste.

The above techniques offer the following advantages.

According to this method of rendering sludge which has sedimented in a chromium plating impurity recovery electrolysis tank harmless, when a natural organic substance was added and stirred into the sludge with adhering hexavalent chromium and the product was reduction calcinated, iron oxide, ferrous oxide and trivalent chromium (Fe. $Cr)_2O_3$ were converted to solids in the form of a ferrite, and elution of hexavalent chromium was not detected.

The reason why hexavalent chromium is not detected is unclear, but it appears that the hexavalent chromium adhering to the sludge prior to calcination is converted to trivalent chromium during calcination by phenol polymers contained in the natural organic substance which acts as an organic reducing agent, and harmless complexes of iron oxide, ferrous oxide and trivalent chromium are then formed.

DESCRIPTION OF THE PREFERRED EMBODIMENTS

Next, this invention will be described in detail referring to the appended drawings.

According to this invention, the sludge which is rendered harmless is produced by electrolysis and recovery, in an impurity recovery electrolysis tank A, of a mixture of chromium plating solution, chromium plating effluent and chromic acid wash water in a closed system for recycling chromium plating solution, chromium plating effluent and chromic acid wash water as shown in FIGS. 1 to 4.

Figure 1:
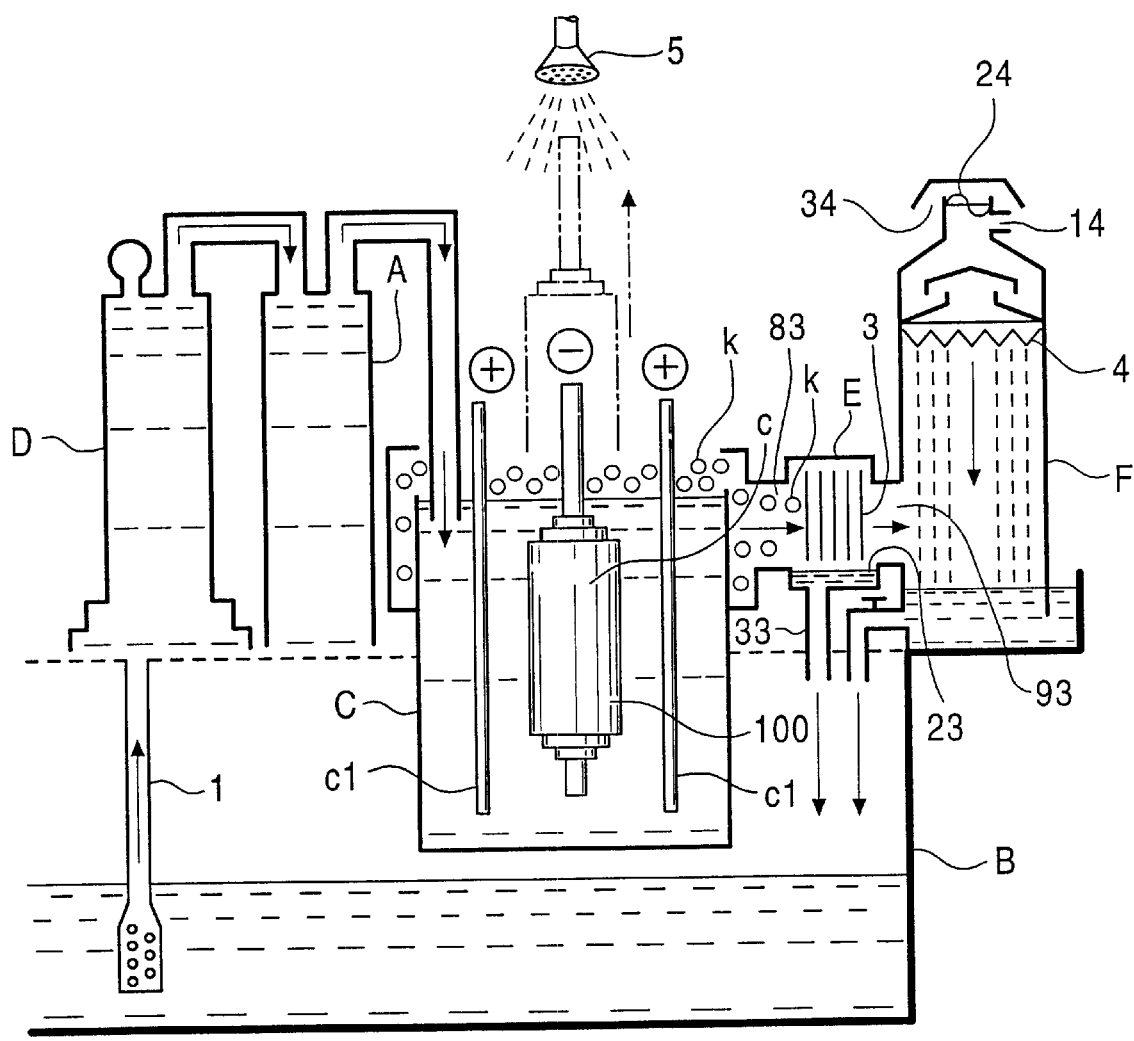
FIG. 1 is an illustrative view of a closed recycling system comprising an impurity recovery electrolysis tank used in the method of making sludge harmless according to this invention.

In the closed recycling system of this invention, as shown in FIG. 1, the necessary equipment comprising a recovery tank B, chromium plating tank C, filter D, impurity recovery electrolysis tank A, chromic acid mist recovery apparatus E and chromic acid mist scrubber D, is installed in the chromium plating room. The filters, chromic acid mist recovery apparatus E and chromic acid mist scrubber F are connected to the recovery tank B. The chromium plating tank C is arranged above the recovery tank B. All of the chromium plating solution, chromium plating effluent and chromic acid wash water is recovered in the recovery tank B, and is not discharged outside the chromium plating room.

The chromium plating tank C is an apparatus for chromium plating an object. It is arranged above the recovery tank B, so any chromium plating solution which leaks or chromic acid water which is produced when the chrome plated object c is raised up and washed with water by a shower above the chromium plating tank C, can be recovered in the recovery tank B.

Chromium plating is performed by electrolysis. Anodes c1, c1 are arranged facing each other a certain distance apart in the chromium plating tank C, and an object 100 to be plated is positioned between them.

The recovery tank B recovers all of the chromium plating solution that has leaked out of the chromium plating tank C, chromium effluent from the chromium plating tank C replaced for purposes of quality control, and chromic acid water and chromic acid wash water from the chromic acid mist recovery apparatus E and chromic acid mist scrubber F.

The filter D is used to filter off solid suspended and floating matter (particle size 1.7–7.0$\mu$) contained in the chromium plating solution, chromium plating effluent and chromic acid wash water in the recovery tank B. The chromium plating solution, chromium plating effluent and chromic acid wash water from the recovery tank B is aspirated by an intake pipe 1, and after filtering solid suspended and floating matter on an internal filter tube, not shown, the solution is sent to the impurity recovery electrolysis tank A to remove impurities.

Figure 2:
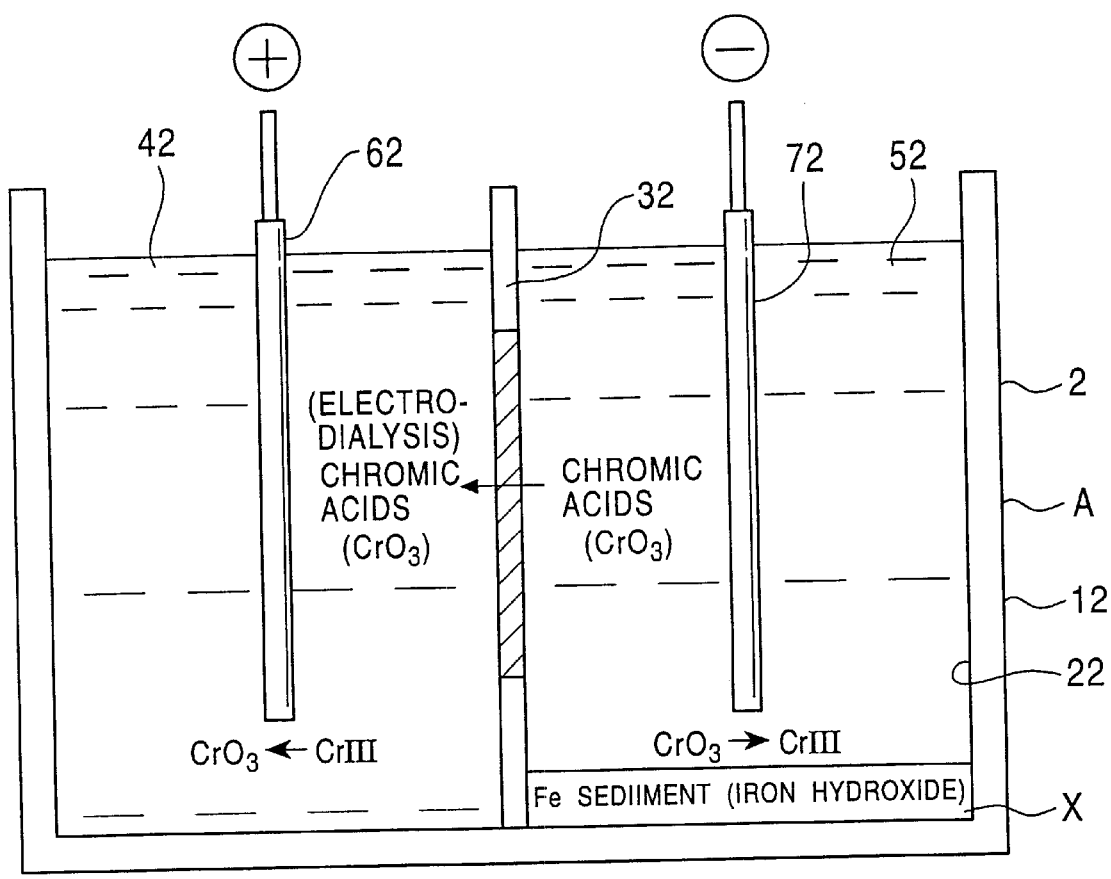
FIG. 2 is an internal schematic view of an impurity recovery electrolysis tank.

The impurity recovery electrolysis tank A has the function of decreasing impurities (metal ions such as iron, copper and zinc, and trivalent chromium), and of removing sediment, as shown in FIG. 2. Its structure is that of a double tank 2 comprising an outer tank 12 and inner tank 22 as shown in FIG. 2. The outer tank 12 is covered by a fluoron sheet, and the inner tank 22 is of tough vinyl chloride resin. The interior of the inner tank 22 is divided into an anode chamber 42 and a cathode chamber 52 by a membrane 32. + and − bus bars are provided in the upper part of the tank 2 from which a lead alloy anode 62 and iron cathode 72 are suspended. These chambers are filled with chromium plating solution (solution from which solid suspended and floating matter was separated by filtration). When electrolysis starts, three reactions proceed simultaneously, and a low impurity, highly concentrated chromic acid (hexavalent chromium) regenerated solution is produced in the anode chamber 42.

More specifically, when electrolysis starts in the anode chamber 42 and cathode chamber 52, electrodialysis of chromic acid occurs from the cathode chamber 52 via the membrane 32 to the anode chamber 42. At the same time as dialysis of chromic acid, electrolytic oxidation of trivalent chromium ($Cr^{3+}$) to chromic acid ($Cr^{3+} \rightarrow CrO_3$) proceeds in the anode chamber 42. As a result, the chromic acid concentration in the anode chamber 42 increases and trivalent chromium decreases. When electrolysis is complete, a regenerated solution is obtained that can be used as a chromium plating solution.

On the other hand in the cathode chamber 52 of the impurity recovery electrolysis tank A, chromic acid which was combined with iron is reduced by electrolysis of the chromium plating solution to trivalent chromium, metal ion impurities (metal ions of iron, copper and zinc, etc.) separate from complexes, and sediment as a sludge X (iron hydroxide).

The chromic acid mist recovery apparatus E is a dry apparatus, and has the function of recovering and liquefying a chromic acid mist k generated from oxygen and hydrogen which are produced when electrolysis takes place during chrome plating, and transferring the liquid into the recovery tank B.

Figure 3:
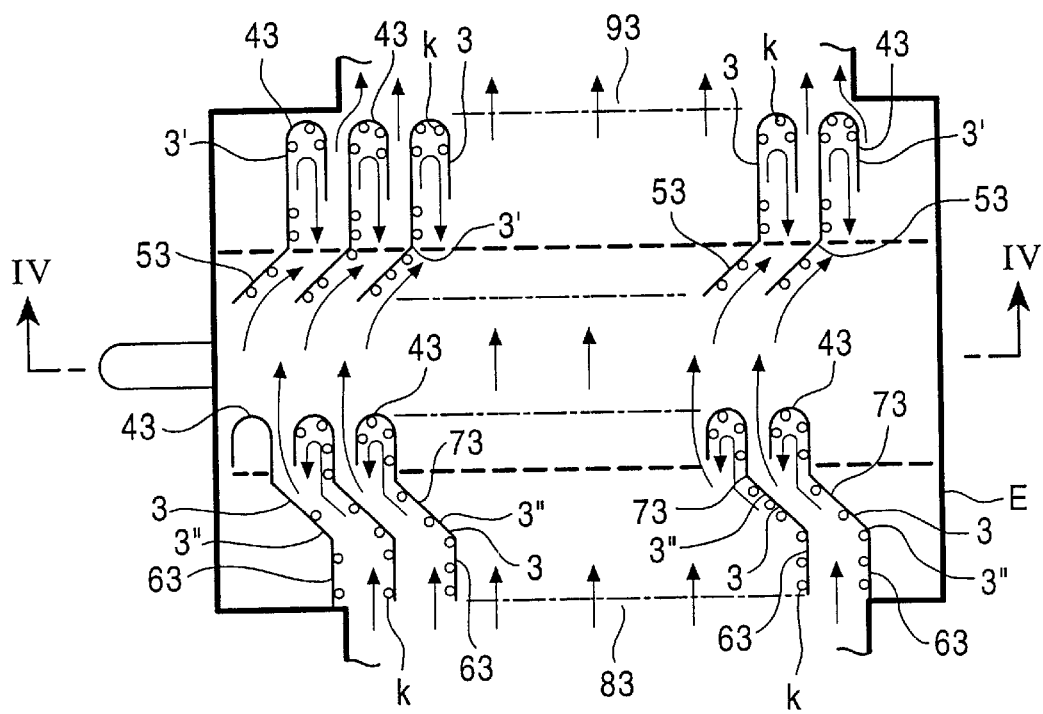
FIG. 3 is an internal illustrative plan view of a chromic acid mist recovery apparatus.
Figure 4:
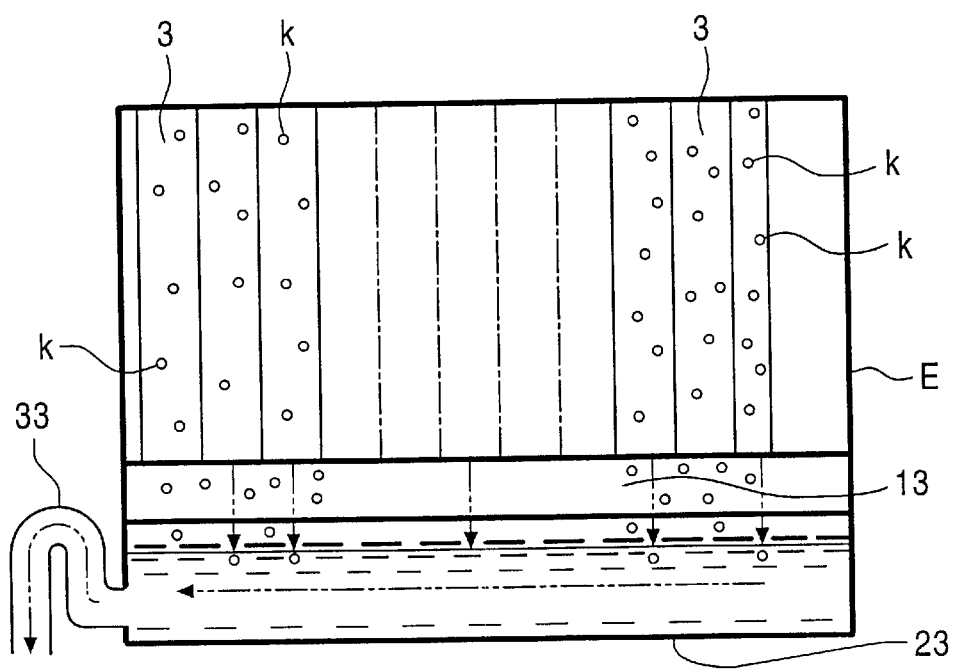
FIG. 4 is a view in section along a line (IV)—(IV) in FIG. 3.
Figure 5:
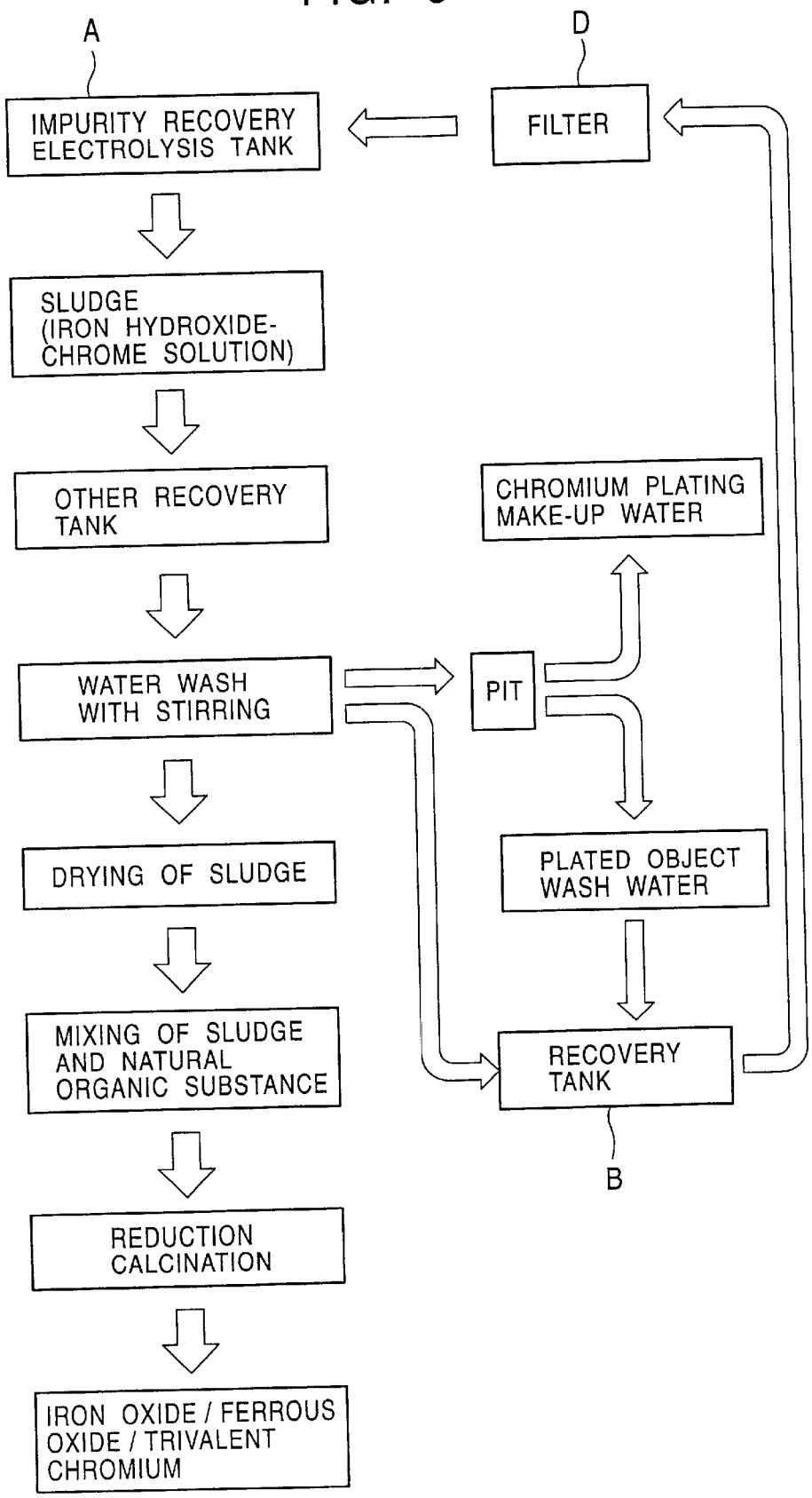
FIG. 5 is a flowchart of the method of making sludge harmless according to this invention.

Describing the internal structure of this dry type chromic acid mist recovery apparatus E, as shown in FIGS. 3 and 4, a plurality of chromic acid liquefying plates 3 are arranged in a vertical direction at an angle of 45 degrees relative to the flow of chromic acid mist. When the chromic acid mist k strikes these plates, it liquefies and adheres to them due to inertia and centrifugal force, flows down the plates 3 to collect in a collector 13 as chromic acid, and then flows from a recovered liquid receiving tank 23 via an outflow pipe 33 into the recovery tank B.

More specifically, these chromic acid mist liquefying plates 3 comprise first liquefying plates 3' having a U-shaped portion 43 at one end and an inclined portion 53 at the other end, and second liquefying plates 3" having a U-shaped portion 43 at one end, and a portion 63 which is parallel to the U-shaped portion 43, and a portion 73 inclined at 45 degrees between the U-shaped portion 43 and parallel portion 63, at the other end. These plates 3', 3" are arranged inside the apparatus in equal numbers at positions 83 on the mist inlet side (chromium plating tank side) and positions 93 on the mist outlet side (chromic acid mist scrubber side), so that the inclined portions 53, 73 are oriented at 45 degrees relative to the flow of chromic acid mist k and the U-shaped portions 43, 43 are facing the mist outlet side.

The chromic acid mist scrubber F has the function of washing out and removing chromic acid mist k which was not liquefied by the aforesaid dry type chromic acid mist recovery apparatus E. A shower 4 is provided inside the scrubber, and a chromic acid discharge vapor concentration measuring and examining hole 14 is provided in an intermediate position in a duct above the shower 4. A ventilator 24 is arranged above this examining hole 14, and a discharge vapor window 34 is provided above this ventilator 24.

When the ventilator 24 is operated, chromic acid mist k which was not liquefied in the dry type chromic acid mist recovery apparatus E is aspirated into the chromic acid mist scrubber F, and washed out into the recovery tank B by water introduced from the shower 4.

Therefore, all the chromium plating solution which has leaked from the chromium plating tank C, chromic acid wash water produced when the object 100 to be plated is raised and washed by the shower 5 above the chromium plating tank C, and the chromic acid water and chromic acid wash water from the chromic acid mist recovery apparatus E and chromic acid mist scrubber F, is recovered in the recovery tank B. The mixed solution from the recovery tank B is filtered by the filter D and electrolyzed in the membrane type impurity recovery electrolysis tank A. A regenerated solution which can be used as a chromium plating solution is thereby obtained.

According to the method of this invention, the chromic acid solution from the impurity recovery electrolysis tank A (specifically, the cathode chamber of this tank),from which mainly iron but also copper and zinc have been removed, is sucked up, the sludge (iron hydroxide) X which has sedimented is extracted into another recovery tank by a vacuum cleaner, and distributed in water washing tanks where it is repeatedly washed (water washed with stirring). The water washes containing chromic acid are collected in a pit, and may be re-used as chromic acid solution for the cathode chamber of the impurity recovery electrolysis tank A.

After water washing with stirring, water may be removed in a centrifuge.

Water washed is performed until the amount of hexavalent chromium eluted from the sludge (iron hydroxide) does not exceed 0.2 g/l. The sludge X is then dried, a natural organic substance is added for reduction, and the product is reduction calcinated.

As a drying means, natural drying or assisted drying can be used selectively. In view of the fact that the sludge X is a fine powder, if natural drying is used, the sludge X is filled in a container (e.g. cans or the like), and the cans are dried at room temperature for a given period (e.g. 2 weeks). If assisted drying is used, it is dried in the absence of wind (e.g., the sludge X is spread on the floor of a room, and the room is warmed by a heater which does not expel hot air).

Calcination is performed in an electric furnace or ceramic kiln. Rice husks (a natural substance) as reducing agent are added to and stirred with 1000 g of the sludge with adhering chromium components (hexavalent chromium, trivalent chromium). If the adhesion amount of hexavalent chromium is 0.2 g/l, 30% of husks expressed as a weight proportion (300 g) are added and stirred. When the reducing calcination temperature was 900 degrees and the calcination time was 240 minutes, elution of hexavalent chromium was undetected. Elution of hexavalent chromium was also undetected at a reducing calcination temperature of 1000 degrees and a calcination time of 180 minutes.

If the adhesion amount of hexavalent chromium was 0.1 g/l, rice husks were added to and stirred with the sludge in a weight proportion of 15% (150 g). If the adhesion amount of hexavalent chromium was 0.3 g/l, rice husks were added to and stirred with the sludge in a weight proportion of 45% (450 g). If the adhesion amount of hexavalent chromium was 0.4 g/l, rice husks were added to and stirred with the sludge in a weight proportion of 60% (600 g). In other words, the amount of rice husks added in terms of weight percentage was in linear proportion to the adhesion amount of hexavalent chromium.

By adding a suitable weight percentage of rice husks depending on the adhesion amount of hexavalent chromium, stirring, and calcinating at the aforesaid reducing calcination temperature and for the aforesaid calcination time, elution of hexavalent chromium was undetected in every case.

It appears that during calcination, phenol polymers contained in the natural organic substance (rice husks) act as a reducing agent which converts the hexavalent chromium adhering to the sludge X into trivalent chromium. Harm less completes iron oxide, ferrous oxide and trivalent chromium are then formed which render the sludge harmless.

If washing is performed until the elution amount of hexavalent chromium is no greater than 0.2 g/l, the water washes which contain a large amount of hexavalent chromium may be effectively used as wash water for the object which is being plated or as make-up water for the chromium plating tank. When they have a high concentration, they may first be collected in the recovery tank B, filtered on the filter D, and used as chromic acid solution for the cathode chamber of the impurity recovery electrolysis tank A.

This form of the invention may be applied in the same way to render harmless the sludge which is produced when plating solution in the plating room (specifically, chromium plating effluent which is periodically replaced, referred to hereafter as chromium plating effluent) is periodically directly collected for quality control, not shown in the diagrams, the solution is filtered to remove solid suspended and floating matter, and metal ions such as iron, copper, zinc and chromium contained in the recovered chromium plating effluent are separated in an impurity recovery electrolysis tank.

Due to the conception of the invention as set forth in the above description, sludge which sediments in a chromium plating impurity recovery electrolysis tank can be rendered harmless.

The ferrite solids such as iron oxide, ferrous oxide and trivalent chromium (Fe. $Cr)_2O_3$ produced are magnetic materials. When these materials are of high quality, they have a wide range of applications such as for magnetic tape, radio wave absorbing plates to prevent radio interference, solar heat absorbing materials which make use of thermoelectric conductance, insulating materials for cold areas, materials for rod heating materials and materials for fish grills, and are therefore extremely versatile.

The invention also makes effective use of rice husks whereof 80% of total output in Japan is disposed of as industrial waste, and it therefore achieves two objectives by one technique.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope of the invention as defined by the appended claims.

What is claimed:

1. A method of rendering sludge which sediments in a chromium plating impurity recovery electrolysis tank harmless, said method comprising:

separating metal ions contained in chromium plating effluent or a mixed solution of chromium plating solution, chromium plating effluent and chromic acid wash water in an impurity recovery electrolysis tank in the form of a sludge which is extracted, washing said sludge with water until the amount of hexavalent chromium eluted from the sludge does not exceed 0.2 g/l, separating the wash water containing chromic acid and the sludge, drying said sludge which sedimented in the water washing, adding natural organic rice husks to said sludge, and reduction calcinating said sludge containing the natural organic substance under a reducing calcination temperature of between 900 and 1000° C., thereby rendering said sludge harmless with reproducibility.

2. The method of rendering sludge which sediments in a chromium plating impurity recovery electrolysis tank harmless as defined in claim 1, wherein the metal ions comprise at least one of iron, copper, zinc and chromium.

3. A method of rendering sludge which sediments in a chromium-plating-impurity-recovery-electrolysis tank harmless, said method comprising:

collecting chromium containing wastewaters in a recovery-electrolysis tank;

separating metal ions in the form of a sludge which is extracted from said wastewaters;

washing the extracted sludge with water;

removing water from the washed sludge;

drying the washed sludge;

adding an organic reducing agent containing natural organic rice husks to the washed sludge; and reduction-calcinating the sludge containing the natural organic rice husks.

4. The method according to claim 3 wherein said organic reducing agent comprises phenol polymer.

5. A method of rendering sludge which sediments in a chromium plating impurity recovery electrolysis tank harmless, said method comprising:

separating metal ions contained in chromium plating effluent or a mixed solution of chromium plating solution, chromium plating effluent and chromic acid wash water in an impurity recovery electrolysis tank in the form of a sludge which is extracted, washing said sludge with water, separating the wash water containing chromic acid and the sludge, drying said sludge which sedimented in the water washing, adding natural organic rice husks to said sludge, and reduction calcinating said sludge containing the natural organic rice husks whereby rendering said,sludge harmless with reproducibility.

* * * * *

UNITED STATES PATENT AND TRADEMARK OFFICE
CERTIFICATE OF CORRECTION

PATENT NO.   : 6,379,559 B1
DATED        : April 30, 2002
INVENTOR(S)  : H. Iida It is certified that error appears in the above-identified patent and that said Letters Patent is hereby corrected as shown below:

Title page,
Item [56], References Cited, FOREIGN PATENT DOCUMENTS,
"54-061077" should be -- 54-061071 --.

Column 8,
Line 20, "said,sludge" should be -- said sludge --.

Signed and Sealed this

Twenty-eighth Day of January, 2003

JAMES E. ROGAN
*Director of the United States Patent and Trademark Office*